United States Patent
Caldwell

[11] Patent Number: 5,873,194
[45] Date of Patent: Feb. 23, 1999

[54] PERFORATED EMBOSSED LANDSCAPING FILM

[75] Inventor: E. Neal Caldwell, Knoxville, Tenn.

[73] Assignee: Dalen Products, Inc., Knoxville, Tenn.

[21] Appl. No.: 730,229

[22] Filed: Oct. 15, 1996

[51] Int. Cl.[6] .................................................. A01G 7/00
[52] U.S. Cl. ........................................................... 47/9
[58] Field of Search ........................................ 47/9, 1.07

[56] References Cited

U.S. PATENT DOCUMENTS

| | | | |
|---|---|---|---|
| 1,396,269 | 11/1921 | Eckart | 47/9 |
| 1,954,424 | 4/1934 | Otwell | 47/9 |
| 3,439,450 | 4/1969 | Richards | 47/9 |
| 3,580,196 | 5/1971 | Lofgreen | 111/1 |
| 3,805,446 | 4/1974 | Aoyagi | 47/9 |
| 3,955,319 | 5/1976 | Smith | 47/9 |
| 4,518,280 | 5/1985 | Fletcher | 47/9 |
| 4,910,052 | 3/1990 | Caldwell | 428/15 |
| 4,984,384 | 1/1991 | Kaufmann | 47/9 |
| 5,047,099 | 9/1991 | Caldwell | 156/60 |
| 5,058,317 | 10/1991 | McMurtrey | 47/25 |
| 5,077,935 | 1/1992 | Stoever et al. | 47/9 |
| 5,181,952 | 1/1993 | Burton et al. | 504/347 |

FOREIGN PATENT DOCUMENTS

| | | | |
|---|---|---|---|
| 574897 | 4/1933 | Germany | 47/9 |
| 1163596 | 7/1961 | Germany | 47/9 |

*Primary Examiner*—Michael J. Carone
*Assistant Examiner*—Joanne C. Downs
*Attorney, Agent, or Firm*—Luedeka, Neely & Graham, P.C.

[57] ABSTRACT

A landscaping system for minimizing downward penetration of weed roots. A polymer film having upper and lower surfaces and a selected porosity is positioned such that soil is disposed below and contacting the lower surface of the film. Mulch is disposed above the film, and contacts the upper surface of the film. There are projections formed in the film that extend away from the upper surface of the film and toward the mulch. The projections have a frustro-conical shape, or in other words are shaped like frustra, with sidewalls configured for deflecting roots growing along the film in an upward direction away from the film. The projections terminate at an apex, and are formed on the film at a selected density per unit area of the film. Apertures are formed in the film at the apex of the projections. The apertures have a selected diameter which is sufficiently large to allow passage of liquid water through the film. The selected density of the projections and the selected diameter of the apertures are chosen so as to provide the film with the selected porosity, such that water passes through the film at a rate approximately equal to that of highly porous soil. The polymer film may have an embossed patter of relatively high points, which are interspersed with relatively low points. A majority of the projections may be formed in the low points of the embossed pattern of the polymer film.

20 Claims, 2 Drawing Sheets

PERFORATED EMBOSSED LANDSCAPING FILM

FIELD OF THE INVENTION

The present invention relates to the field of landscaping materials. More particularly, the invention relates to a perforated embossed landscaping film for controlling weed growth.

BACKGROUND OF THE INVENTION

Mulch barriers, such as landscaping films, are commonly placed underneath the mulch used in landscaping around shrubs, trees, and decorative plants. The mulch barrier reduces weed growth and extends the life of the mulch by keeping it away from the soil. A non-porous plastic sheet, such as black plastic, provides excellent mulch life and weed control. However, a plastic sheet excludes water and air from the earth beneath it, often resulting in the death of, or damage to, the plants around which it is placed.

By perforating the plastic sheet, air and water can pass through the plastic sheet to the soil. However, mulch lying on top of the holes tends to block them, resulting in the problems mentioned above. Placing a greater number of holes in the sheet tends to alleviate the problem of blocked holes, but reduces the ability of the barrier to provide weed control.

Using a fabric material as a mulch barrier allows water and air to reach the soil, and provides limited control of the weeds which emerge from the earth. However, the weeds which start in the mulch tend to send their roots down through the fabric into the ground, where they thrive in the moist environment which the fabric preserves. The roots of the weeds become so enentangled in the fabric that they typically cannot be removed without pulling up or tearing the fabric.

What is needed, therefore, is landscaping film which allows an adequate amount of water and air to reach the soil, but is effective in reducing weed root penetration.

SUMMARY OF THE INVENTION

The above and other needs are provided by a landscaping system for minimizing downward penetration of weed roots. A polymer film having upper and lower surfaces and a selected porosity is positioned such that soil is disposed below and contacting the lower surface of the film. Mulch is disposed above the film, and contacts the upper surface of the film. There are projections formed in the film that extend away from the upper surface of the film and toward the mulch. The projections have a frustro-conical shape, or in other words are shaped like frustra, with sidewalls configured for deflecting roots growing along the film in an upward direction away from the film. The projections terminate at an apex, and are formed on the film at a selected density per unit area of the film. Apertures are formed in the film at the apex of the projections. The apertures have a selected diameter which is sufficiently large to allow passage of liquid water through the film. The selected density of the projections and the selected diameter of the apertures are chosen so as to provide the film with the selected porosity, such that water passes through the film at a rate approximately equal to that of highly porous soil.

In a preferred embodiment the polymer film has an embossed pattern of relatively high points, which are interspersed with relatively low points. In a most preferred embodiment a majority of the projections are formed in the low points of the embossed pattern of the polymer film.

In an alternate embodiment of the invention, a landscaping film for use as a barrier between mulch and soil is provided. The film has projecting perforations which project generally toward the mulch and away from soil. There is an embossed pattern of relatively high points in the film, which are interspersed with relatively low points. The perforations and embossed pattern are disposed so as to deflect away from the film roots growing from the mulch toward the film.

BRIEF DESCRIPTION OF THE DRAWINGS

The preferred embodiments of the invention will now be described in further detail with reference to the drawings, in which like reference numbers denote like elements throughout the different views, and which are not to scale, and wherein.

DETAILED DESCRIPTION OF THE PREFERRED EMBODIMENTS

Figure 1:
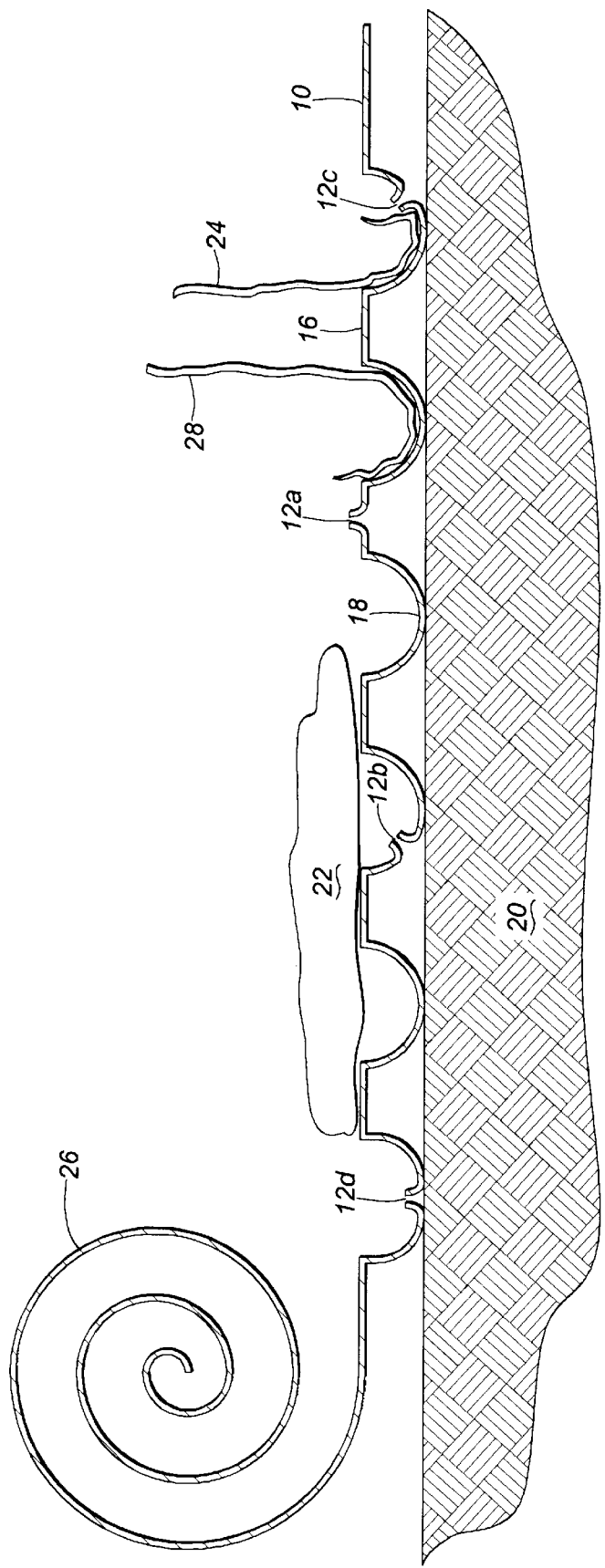
FIG. 1 is a cross-sectional view of a landscaping film.

Referring now to the drawings, there is depicted in FIG. 1 a cross-sectional view of a landscaping film 10 according to the present invention. Film 10 is preferably comprised of a relatively non-biodegradable material, so that it does not appreciably decompose over time, but instead tends to retain its ability to separate the mulch 22 from the soil 20. By keeping the mulch 22 and the soil 20 separate, the life of the mulch 22 is extended. However, in alternate embodiments, it may be preferable for the film 10 to decompose after a relatively brief period of time, in which case the film 10 would be made of a biodegradable material.

The film 10 is preferably impervious to water, or in other words, water cannot readily transport through the film 10 itself. A polymer, such as a polyolefin material, is well suited for this application, and polyethylene is particularly preferred. The film 10 thickness is preferably between about 0.5 mils (thousandths of an inch) and 6 mils.

A pattern is preferably embossed into the film 10, having both high points 16 and low points 18. It will be appreciated that the high points 16 are so termed because they are relatively higher than the low points 18. Similarly, the low points 18 are so termed because they are relatively lower than the high points 16. As depicted, the high points 16 have a generally flat surface. Preferably, the embossed depth of the embossed pattern is about 20 mils. By embossed depth it is meant the relative difference in height between the high points 16 and the low points 18 of the embossed pattern.

The embossed pattern in the film 10 preferably forms a fabric type pattern, or in other words, the embossed pattern, when viewed from above or below, provides the general visual impression of a loosely woven fabric. The embossed pattern preferably has a distance of about 50 mils between adjacent high points 16, or in other words, from center-point to center-point of adjacent high points 16. In a most preferred embodiment, the surface of the high points 16 comprise between about 20% and about 40% of the embossed pattern, or in other words, the high points 16 comprise between about 20% and about 40% of the surface area of the film 10. The low points 18 have a generally rounded shape, as depicted. Preferably, the low points 18 are either hemispherical, or semi-cylindrical in shape.

Perforations 12 are also formed in the film 10. The perforations 12 are formed such that they project generally toward the mulch 22 and away from the soil 20. The perforations 12 may be formed at random intervals relative to the embossed pattern, or in a predetermined pattern that aligns with the embossed pattern, so that all of the perforations 12, for example, may be formed in the low points 18, such as perforation 12d, and not on the high points 16, such as perforation 12a. In a preferred embodiment, the perforations 12 are spaced about 250 mils apart.

The perforations 12 preferably have an open diameter of between about 15 mils and about 30 mils. The number of perforations 12 and the open diameter of the perforations 12 are chosen so that the landscaping film has a porosity substantially equal to highly porous soil. Thus, even though the film 10 may itself be of a water impervious material, the perforations 10 allow the landscaping film to pass water through the film 10. This ability is provided so that water does not pool above the film 10, which may cause the mulch 22 to decompose at an accelerated rate, and may also damage plant life under or near the landscaping film, as described above.

Figure 2:
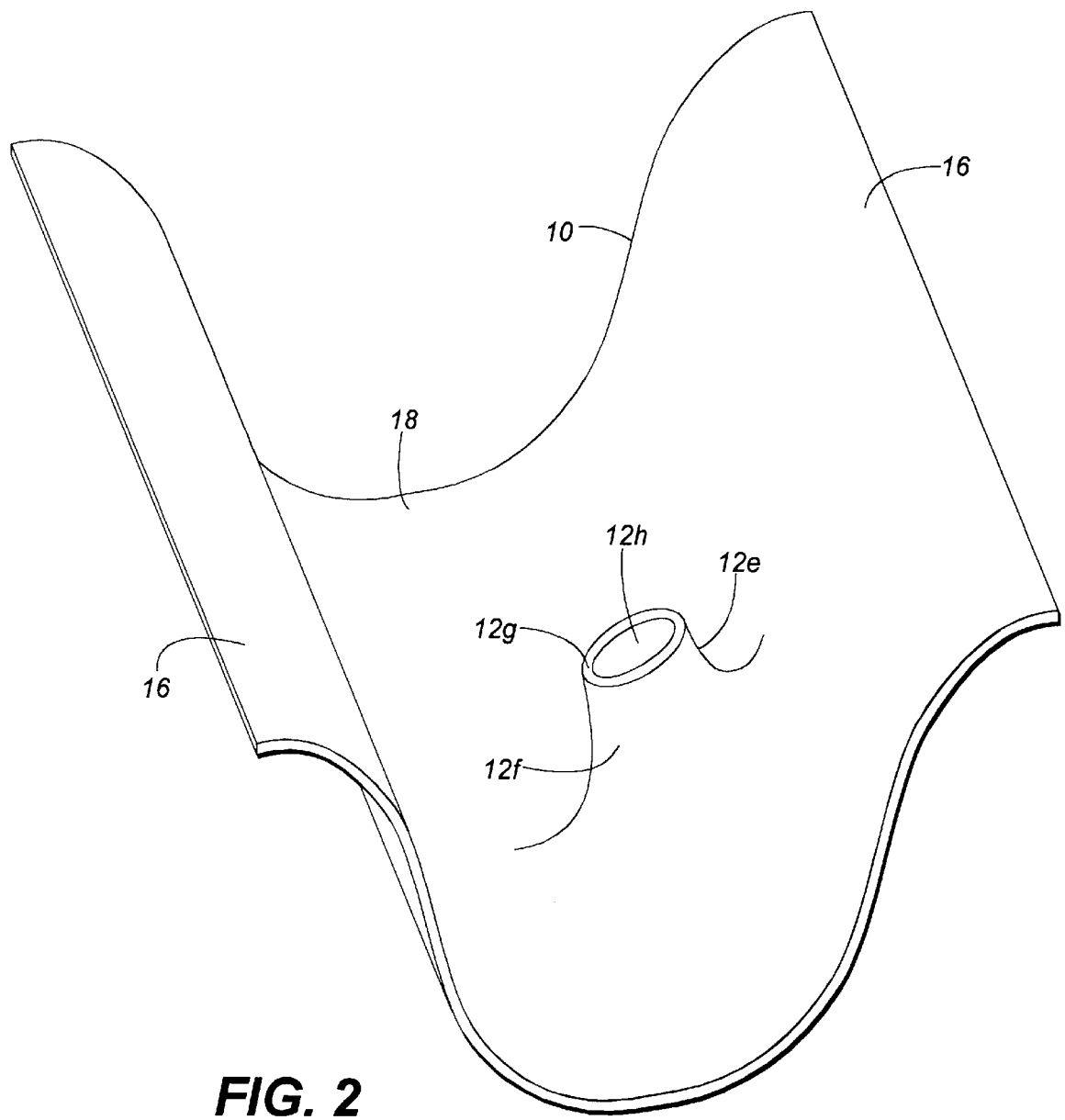
FIG. 2 depicts the top surface of a landscaping film.

The perforations 12 may also be described as frustrum shaped projections 12e, as depicted in FIG. 2, or in other words, partial conical sections with the top portion of the cone truncated. The projections 12e extend away from the upper surface of the film 10 and toward the mulch (not depicted in FIG. 2). As can be seen in FIG. 2, the projections 12e have generally rounded side walls 12f. The projections 12e terminate at an apex 12g, at which is formed an aperture 12h. The aperture 12h has a selected diameter which is sufficiently large as to allow passage of liquid water through the film 10. As described above, the density of the projections 12e and the diameter of the apertures 12h are chosen to provide the film 10 with a selected porosity approximately equal to that of highly porous soil.

The landscaping film is preferably provided in a roll 26, depicted in FIG. 1. The film 10 is wound into the roll 26 such that the perforations 12 generally project into the roll 26, as is depicted. When provided in this manner, the landscaping film is most easily deployed by laying the roll 26 on the surface of the soil 20 to which it is to be applied, and the roll 26 is unwound by rolling it across the surface of the soil 20. When deployed in this manner, the high spots 16 are oriented in their correct position relative to the low spots 18, and the perforations 12 are oriented correctly so as to be projecting generally toward the mulch 22, which is then placed on top of the film 10.

The landscaping film has several advantages over the prior art when deployed in this manner. As depicted, the high points 16 tend to elevate the mulch 22 above the low points 18. Thus, perforations 12b, which are located in the low points 18 of the film 10, are not crushed or pinched closed by the weight of the mulch 22. If not for the high points 16 providing this function, the perforations 12b may be pinched closed by the mulch 22, and water would not be able to as readily penetrate the film 10. This would tend to result in water pooling above the film 10, which would hasten decomposition of the mulch 22, and drying of the soil 20 beneath the film 10. As explained above, this drying of the soil 20 could result in damage to surrounding plant life. Thus, the high points 16 and the low points 18 provide for a landscaping film which tends to retain its porosity.

The shape of the low points 18, as described above, and the shape of the perforations 12, which project generally toward the mulch 22, work in combination to reduce weed penetration of the landscaping film. As depicted, weed root 24, which is growing down from the mulch 22, encounters a low point 18, and is deflected somewhat from its original vertical and downward direction of growth, to a more horizontal direction of growth as it nears the bottom of the low point 18. As the root 24 encounters the perforation 12c, the shape of the perforation 12c, which projects generally toward the mulch 22, further deflects the root 24 from its generally horizontal direction of growth, to a more vertical and upward direction of growth, back toward the mulch 22. Thus the embossed pattern and the perforations 12 are disposed so as to work in concert to deflect roots 24 away from the film 10.

It will be appreciated that a root 28 which grows toward the film 10 from the mulch 22 and encounters a low point 18 in which there is no perforation 12, will be deflected by the hemispherical or semi-cylindrical shape of the low point 18 back toward the mulch 22. A root, such as 24 or 28, would be unlikely to grow directly toward the film 10 in the exact position of a perforation 12. Further, perforation 12a, located on a high point 16, would be in a minority, as the high points 16 comprise at most less than half of the surface area of the film 10. Thus, a landscaping film according to the present invention will tend to reduce the degree of penetration of film 10 by roots 24 or 28. Therefore, those weeds which grow in the mulch 22 above the landscaping film will typically not have roots which are interwoven with the film 10, and can be more easily removed from the mulch 22.

It will be appreciated that the invention is not limited to the disclosed embodiments, but covers various modifications and equivalent arrangements included within the spirit and scope of the appended claims.

What is claimed is:

1. A landscaping system for minimizing downward penetration of weed roots comprising:

a polymer film having upper and lower surfaces and having a selected porosity, soil disposed below and contacting the lower surface of the film, mulch disposed above and contacting the upper surface of the film, projections formed in the film extending away from the upper surface of the film and toward the mulch, the projections having a frustro-conical shape with sidewalls configured for deflecting roots growing along the film in an upward direction away from the film, the projections terminating at an apex and being formed on the film at a selected density per unit area of the film, apertures formed in the film at the apex of the projections having a selected diameter sufficiently large to allow passage of liquid water through the film, the selected density of the projections and the selected diameter of the apertures chosen to provide the film with the selected porosity such that water passes through the film at a rate approximately equal to that of highly porous soil.

2. The landscaping system of claim 1 further comprising the polymer film having an embossed pattern of relatively high points interspersed with relatively low points.

3. The landscaping system of claim 2 further comprising a majority of the projections being formed in the low points of the embossed pattern of the polymer film.

4. A landscaping film for use as a barrier and positionable between mulch and soil, comprising a film having perforations having sidewalls terminating at an apex, the perforations being oriented such that when the film is positioned between the mulch and the soil during use the perforations project generally toward the mulch and away from the soil, the film having an embossed pattern of relatively high points interspersed with relatively low points with the high points tending to elevate the mulch above the low points when the landscaping film is positioned between the mulch and the soil, wherein the perforations are located in the low points so that they are not crushed or pinched by the weight of the mulch during use and remain open to enable water to readily penetrate therethrough during use, the perforations and embossed pattern being further disposed so as to work in concert to reduce weed of the landscaping film functioning to deflect roots of weeds located in the mulch adjacent the film in a direction generally away from the film.

5. The landscaping film of claim 4 further comprising the film having a thickness of between about 0.5 mils and about 6 mils.

6. The landscaping film of claim 4 wherein the film further comprises a polyolefin material.

7. The landscaping film of claim 4 wherein the film further comprises polyethylene.

8. The landscaping film of claim 4 wherein the embossed pattern further comprises a fabric pattern.

9. The landscaping film of claim 4 further comprising the embossed pattern having a depth of about 20 mils and a distance between adjacent high points of about 50 mils.

10. The landscaping film of claim 4 further comprising the high points having a generally flat surface.

11. The landscaping film of claim 4 wherein the high points further comprise between about 20% and about 40% of the embossed pattern.

12. The landscaping film of claim 4 further comprising the low points having a generally hemispherical shape.

13. The landscaping film of claim 4 further comprising the low points having a generally semi-cylindrical shape.

14. The landscaping film of claim 4 further comprising the film wound into a roll with the perforations generally projecting into the roll.

15. The landscaping film of claim 4 further comprising the perforations having a diameter of between about 15 mils and about 30 mils.

16. The landscaping film of claim 4 further comprising the perforations spaced about 250 mils apart.

17. The landscaping film of claim 4 further comprising the perforations randomly spaced in the film relative to the embossed pattern.

18. The landscaping film of claim 4 further comprising most of the perforations located away from the high points of the embossed pattern.

19. The landscaping film of claim 4 further comprising the film having a porosity substantially equal to highly porous soil.

20. A landscaping film for use as a barrier and positionable between mulch and soil, comprising a polyethylene film having a thickness of between about 0.5 mils and about 6 mils, having an embossed, fabric shaped pattern of relatively high points interspersed with relatively low points with the high points tending to elevate the mulch above the low points when the landscaping film is positioned between the much and the soil, the embossed pattern having an embossed depth of about 20 mils, and a distance between adjacent high points of about 50 mils, the high points having a generally flat surface and constituting between about 20% and about 40% of the embossed pattern, the low points have a generally hemispherical shapes the film having perforations having sidewalls terminating at an apex having a diameter of between about 15 mils and about 30 mils and being located in the low points so that the perforations are not crushed or pinched by the weight of the mulch during use and remain open to enable water to readily penetrate therethrough during use, the perforations being configured to project generally toward the mulch away from the soil and cooperate with the embossed pattern to reduce weed penetration of the landscaping film by functioning to deflect roots of weeds located in the mulch adjacent the film in a direction generally away from the film en the film is positioned between soil and mulch, the perforations spaced about 250 mils apart, and the film wound into a roll with the perforations generally projecting into the roll.

* * * * *